United States Patent [19]

Sabot et al.

[11] Patent Number: 4,844,808

[45] Date of Patent: Jul. 4, 1989

[54] LIQUID/LIQUID EXTRACTION OF GALLIUM VALUES

[75] Inventors: Jean-Louis Sabot, Maisons Laffitte; Richard Fitoussi, Saint-Mande, both of France

[73] Assignee: Rhone-Poulenc Chimie, Courbevoie, France

[21] Appl. No.: 247,484

[22] Filed: Sep. 21, 1988

[30] Foreign Application Priority Data

Sep. 21, 1987 [FR] France .............................. 87 13024

[51] Int. Cl.⁴ .............................................. B01D 11/04
[52] U.S. Cl. ..................................... 210/634; 423/112
[58] Field of Search ................. 75/101 BE; 423/112; 210/634

[56] References Cited

U.S. PATENT DOCUMENTS

| | | | |
|---|---|---|---|
| 3,971,843 | 7/1976 | Helgorsky et al. | 423/112 |
| 4,169,130 | 9/1979 | Helgorsky et al. | 423/112 |
| 4,241,029 | 12/1980 | Helgorsky et al. | 423/112 |
| 4,485,076 | 11/1984 | Bauer et al. | 75/101 BE X |
| 4,559,203 | 12/1985 | Bauer et al. | 423/112 |
| 4,724,129 | 2/1988 | Helgorsky et al. | 423/112 |

Primary Examiner—Frank Spear
Attorney, Agent, or Firm—Burns, Doane, Swecker & Mathis

[57] ABSTRACT

Gallium values are separated and recovered from strongly basic aqueous solutions thereof, e.g., Bayer process aluminate liquors, by (i) contacting such basic solution with an organic phase comprising an organic extractant and an organic solvent and liquid/liquid extracting gallium values therefrom, and permitting phase separation into an aqueous phase and an organic phase containing said extracted gallium values; (ii) contacting said organic phase with a solution of an acid halide in part comprising acidic phase recycled from the below stage (iv), after the selective extraction thereof, and liquid/liquid extracting gallium values therefrom, and permitting phase separation into a second organic phase and an acid phase containing said extracted gallium values; (iii) adjusting the halide ion concentration of the acidic gallium phase; (iv) selectively extracting gallium values from said acidic gallium phase; and (v) recovering such selectively extracted gallium values.

13 Claims, 1 Drawing Sheet

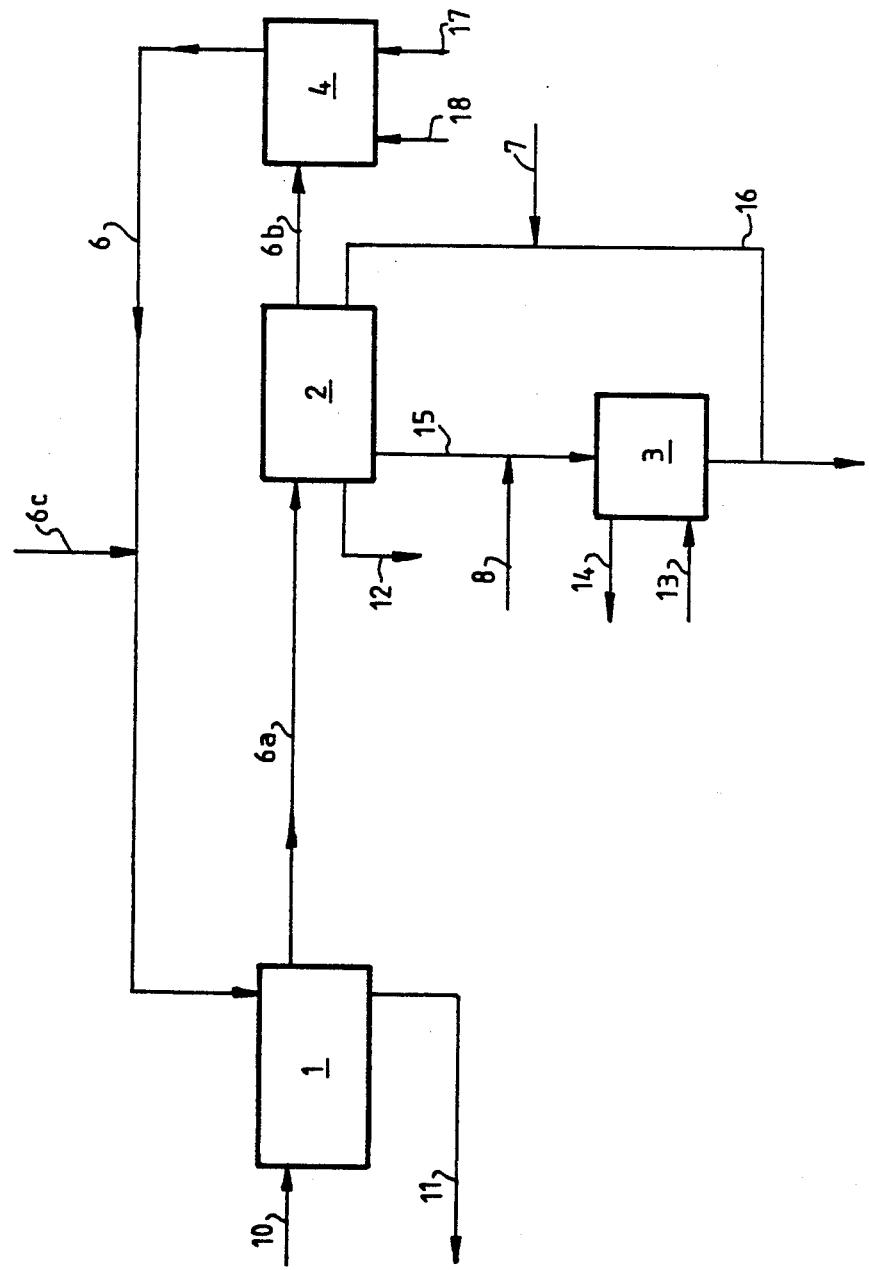

LIQUID/LIQUID EXTRACTION OF GALLIUM VALUES

BACKGROUND OF THE INVENTION

1. Field of the Invention

The present invention relates to the separation and recovery of gallium values, by liquid/liquid extraction, from highly basic aqueous solutions containing such gallium values, for example the sodium aluminate liquors emanating from the Bayer process for the production of alumina.

2. Description of the Prior Art

Processes are known to this art for the recovery of gallium values present in aqueous alkaline solutions by liquid/liquid extraction utilizing an organic phase containing an extractant and an organic solvent, as well as for the purification of the gallium solution to eliminate certain cations, such as, for example, the aluminum and sodium cations extracted together with the gallium values from the aforesaid aluminate liquors. Particularly compare published French Applications Nos. 2,277,897, 2,307,047, 2,307,882, 2,495,601, 2,532,295 and 2,532,296.

Such processes entail transferring the gallium values contained in the strongly basic solution into the organic extraction phase by a liquid/liquid extraction technique. In a second stage, this organic phase is treated with an acid solution to back-extract the gallium, with aluminum and sodium cations also being extracted.

The acidic gallium solution containing aluminum and sodium ions is then treated separately to separate the gallium values and the metallic ions.

Numerous processes have been proposed to the art for such purpose and, in particular, the processes described in published French Applications Nos. 2,495,599, 2,495,600 and 2,495,601, assigned to the assignee hereof.

These processes comprise either treating the gallium solution by cascading same over an ion exchange resin of strongly basic type, or extracting the gallium by liquid/liquid extraction, with the extractants being quaternary ammonium salts or alcohols, for example.

The gallium solution may then be subjected to new purification stages.

The final gallium solution is then treated by different processes to produce gallium metal of very high purity, or alloys of gallium with other compounds.

The aforedescribed processing makes it possible to obtain, in very good yields of extraction and recovery, a gallium solution of very high purity. However, the second stage of the process, i.e., the treatment of the organic phase with an acid solution, requires the consumption of a large amount of the acid solution, which is discharged as an effluent after use. These significant liquid effluents are disadvantageous, as they require treatment prior to their discharge, thereby increasing the overall cost of the process.

SUMMARY OF THE INVENTION

Accordingly, a major object of the present invention is the provision of an improved process for the liquid/liquid extraction and recovery of gallium values which conspicuously ameliorates those disadvantages and drawbacks to date characterizing the state of this art, and which, notably, permits a marked decrease in acid consumption, as well as in the amount of effluent to be discharged. Thus, the process of the present invention is most economically attractive vis-a-vis the prior art.

Briefly, the present invention features the separation and recovery of gallium values from strongly basic aqueous solutions thereof, by liquid/liquid extraction techniques employing an organic phase which includes an extractant and an organic solvent, and which comprises the following stages:

(i) extracting the gallium values from the strongly basic solution by contacting same with said organic phase;

(ii) back-extracting the gallium values transferred into said organic phase with an acid solution;

(iii) adjusting the halide ion concentration of the resulting acidic gallium solution;

(iv) selectively extracting the gallium values from said solution; and (v) recovering the gallium values extracted in such manner.

BRIEF DESCRIPTION OF THE DRAWING

The Figure of Drawing is a schematic/diagrammatic illustration of exemplary process/apparatus according to this invention.

DETAILED DESCRIPTION OF THE PREFERRED EMBODIMENTS OF THE INVENTION

More particularly according to the present invention, the acid solution used in stage (ii) is advantageously at least a fraction of the acid solution recovered in stage (iv) after the selective extraction of the gallium values. The basic parameters of the stages (i) to (v) have been described in numerous patents, and, in particular, in published French Applications Nos. 2,277,897, 2,307,047, 2,307,882, 2,495,601, 2,532,295 and 2,532,296, hereby expressly incorporated by reference.

Thus, the extraction of the gallium from the organic phase (ii) is carried out by liquid/liquid extraction employing an acid solution having a $H^+$ concentration and a feed rate such that the $H^+$ ion concentration of the acid solution which contacts the organic solution in stage (ii) is higher than or equal to 1.5 N, and preferably ranges from 1.5 to 6, more preferably from 3.5 to 4.5, for a halogen concentration less than or equal to 2.5 M.

Exemplary acids suitable for use according to this invention are the inorganic acids such as sulfuric acid, phosphoric acid, nitric acid and hydrochloric acid, or admixtures thereof with another acid.

Stage (iv) of the selective extraction of gallium values from the acid solution may be conducted according to any one of a number of processes heretofore described in the patent and open literature.

Exemplary such liquid/liquid extraction techniques employing one or more solvating agents as the extractant therefor are those utilizing, for example, ethers, ketones, alcohols, esters or organophosphorus compounds, or anionic extractants, such as, for example, amines or quaternary ammonium salts. It is also possible to selectively extract the gallium values by charging the acidic gallium solution over an ion exchange resin. Resins suitable for the invention are those of the basic type, adopted to retain gallium values, characteristically in a complex anionic form $GaX_4$, with X representing a halogen, preferably chlorine or bromine, and advantageously chlorine. Representative are those resins described in published French Application No. 2,495,601 which comprise recurring structural units of the following formulae:

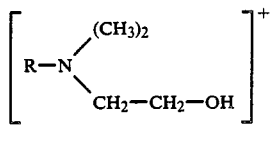

or

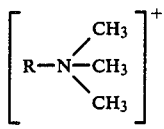

wherein R represents, for example, a styrene-divinylbenzene or acrylic-divinylbenzene copolymer. Exemplary such ion exchange resins are those marketed under the trademarks Dowex 1, Dowex 2, Dowex 3, Duolite A 101 D, Duolite A 42, Lewatit M 500, Amberlite IRA 400, Amberlite IRA 410, Amberlite IRA 900, Amberlite IRA 910, Duolite A 14 and Amberlite IR 45.

The organic phase used in stage (i) contains an extractant, preferably a substituted hydroxyquinoline, for example 7-(5,5,7,7-tetramethyl-1-octen-3-yl)-8-hydroxyquinoline, or the hydroxyquinolines marketed under the trademark Kelex 100 by the Schering Co., or LIX 26 marketed by the Henkel Co. It is also possible to use as the organic phase those specifically described in published French Applications Nos. 2,277,897, 2,307,047, 2,307,882, 2,532,295 and 2,532,296, in published Japanese Applications Nos. 60/042,234, 59/186,683 and 59/50,024, and in published European Application No. 199,905. More generally, the process of the invention may be carried out using any organic phase capable of extracting gallium values according to and consistent with the aforementioned stages (i) to (v).

In sum, the organic phase contains an extractant, a solvent, for example kerosene, one or more compounds with alcohol functions, such as heavy alcohols or heavy phenols, together with various other solvating compounds, such as certain phosphoric esters. It is also advantageous to add compounds which accelerate the rate of extraction of the gallium values, such as compounds containing at least one carboxylic acid function, organophosphorus compounds, sulfates or substituted sulfonates.

The concentration of the extractant is not critical and is generally on the order of 10%.

It is also possible to use as the organic phase a polymer filled with a substituted hydroxyquinoline, such as described in published Japanese Application No. 60/42,234, with stage (ii) of the process entailing an elution of the filled polymer.

Published Japanese Application No. 59/186,683 describes the use of a mixture of substituted hydroxyquinolines, i.e., a mixture of 7-alkyl-8-hydroxyquinoline and 7-(5,5,7,7-tetramethyl-1-octen-3-yl)-8-hydroxyquinoline.

The invention thus permits a reduction in the amount of acid introduced at the level of stage (ii). In effect, at least part of the wash solution for the organic phase is the acid solution recovered at stage (iv).

This reduction in overall acid consumption greatly contributes to the economics of the process and permits a marked reduction in the amount of liquid effluents to be discharged.

The recycling of the acid solution into stage (ii) does not adversely affect the yield of extraction of the metallic cations from the organic phase.

In another embodiment of the invention, the concentration of the halide ions in stage (iii) is adjusted by the addition of hydrochloric acid, whether in the gaseous state or in the form of a concentrated solution.

In stage (iii) the halide ion concentration is adjusted to a value of from approximately 3.5 M to 8 M.

This adjustment is carried out by adding a halogen acid in either the gaseous state or in the form of a concentrated solution.

The preferred halide ions are chloride and bromide ions, with the chloride ion being particularly preferred.

In yet another embodiment of the invention, the $H^+$ and $Cl^-$ (or halogen) concentration and the flow rate of the recycling of the acid solution recovered from stage (iv), are controlled and adjusted, if necessary, to maintain the values of the $H^+$ and $Cl^-$ ion concentration in stage (ii) described above.

In order to further illustrate the present invention and the advantages thereof, the following specific examples are given, it being understood that same are intended only as illustrative and in nowise limitative.

EXAMPLE 1

Into the liquid/liquid extraction battery 1 of the apparatus illustrated in the Figure of Drawing, via inlet line 6, 1,000 l of an organic phase having the following composition by weight were introduced:

Kelex—8%
n-Decanol—10%
Versatic acid—5%
Kerosene—77%

1,000 l of a decomposed sodium aluminate solution emanating from a Bayer process for the production of alumina were also added, via line 10. This solution contained:

$Al_2O_3$—82 g/l
$Na_2O$—166 g/l
Ga—240 mg/l

The decomposed solution, after mixing with the organic phase and subsequent phase separation, was removed via line 11, for example to be recycled back to the Bayer process. This solution had the following composition after treatment:

$Al_2O_3$—80 g/l
$Na_2O$—156 g/l
Ga—80 mg/l

The gallium, alumina and sodium oxide concentrations in the organic phase were the following:

$Al_2O_3$—2 g/l
$Na_2O$—10 g/l
Ga—160 mg/l

This organic phase was then introduced into a liquid/liquid extraction battery 2 via the line 6a.

The organic phase was washed with an acid solution introduced through the conduit 16 and originating in stage (iv) carried out in the vessel 3.

In said battery 2, 1,000 l of the organic phase precipitated with 100 l of the acid solution emanating from the vessel 3 through the conduit 16, were contacted with 80 l water and 20 l concentrated (36 N) sulfuric acid introduced through the line 7. This acid solution had a $H_2SO_4$ concentration equal to 2 mole/liter, a HCl concentration of 2 mole/liter and a concentration of metal chlorides (sodium and aluminum) of 2 mole/liter (expressed as $Cl^-$).

After agitation and separation of the phases, the organic phase was removed through the conduit 6b to an extractor 4, where it was washed several times with water prior to recycling to the extractor 1 via the line 6, after the optional addition of fresh organic solvent through the conduit 6c.

The recovered acid solution contained:
Ga—0.75 g/l
$Al_2O_3$—9 g/l
$Na_2O$—5 g/l
$H^+$—4 N
$Cl^-$—2 M This solution also contained numerous other metallic cations, the concentrations of which were on the order of 10 to 200 mg/l.

Prior to extracting the gallium from this solution in vessel 3, its chloride ion concentration was adjusted to a value of 4 M by the addition of gaseous hydrochloric acid through the line 8.

This solution was introduced through the line 15 at a rate of 1 l/h into columns containing 0.6 l of DUOLITE A 101 of the quaternary ammonium type.

The acid solution recovered through the line 16 contained:
Ga—10 mg/l
$H_2SO_4$—2 moles/l
HCl 2 moles/l
$Al_2O_3$—9 g/l
$Na_2O$—45 g/l 50% of this acid solution was recycled through the conduit 16 into the extractor 2, thus constituting the acid extraction solution of the organic phase.

The extraction acid of the gallium of the organic phase circulated in a closed loop in the process, with on the order of 50% being drained therefrom. The acid consumption may thus be reduced by approximately 50%, which is an important savings, both relative to the consumption of reagents and the treatment of the effluents.

The gallium retained on the resin in the extractor 3 was recovered by elution of the resin with water (1 l/h) introduced through the conduit 13 and recovered through the conduit 14.

The solution obtained contained:
Ga—52 g/l
$Al_2O_3$—5 mg/l
$Na_2O$—20 mg/l
Fe—100 mg/l Other metallic cations on the order of a few mg/l.

This concentrated solution of gallium may then be subjected to successive purifications by known methods, such as, for example, liquid/liquid extraction, resin treatment, and the like.

These purification operations are much less costly, as the volume of the solution to be treated is low due to the high gallium concentration.

EXAMPLE 2

The acidic gallium solution (0.75 g/l) of Example 1 issuing from the battery 2 through the conduit 15 was introduced into the columns 3, after adjusting the chloride ion concentration to 6 mole/l by the addition of hydrogen chloride through the conduit 8.

The gallium was extracted from this solution by liquid/liquid extraction using as the extractant a quaternary ammonium salt marketed by the Henkel Co. under the trademark Aliquat 336, in solution in a solvent marketed under the trademark Solvesso 150, in a concentration of 0.1 M.

This extraction was carried out in a liquid/liquid extraction battery arranged in series.

The acidic gallium solution was introduced into an intermediate extractor at a rate of 10 l/h, the extractant was introduced at one end of the battery at a rate of 2 h/l and was washed at the outlet of the battery with a 6 N hydrochloric acid solution which was added at a rate of 1 l/h.

The gallium was back-extracted from the extractant by washing with water. The gallium solution obtained contained 7 g/l gallium and was purified of iron, sodium and aluminum (it contained less than 100 mg/l of each of these elements). The solution could be purified by any known process.

The acid solution recovered through the conduit 16 contained 6 mole/l chloride ions and $H^+$ concentration equal to 8 N.

33% of this solution was recycled to the gallium extraction battery 2.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the separation and recovery of gallium values from a strongly basic aqueous solution thereof, which comprises (i) contacting such basic solution with an organic phase comprising an organic extractant and an organic solvent and liquid/liquid extracting gallium values therefrom, and permitting phase separation into an aqueous phase and an organic phase containing said extracted gallium values; (ii) contacting said organic phase with a solution of an acid halide in part comprising acidic phase recycled from the below stage (iv), after the selective extraction thereof, and liquid/liquid extracting gallium values therefrom, and permitting phase separation into a second organic phase and an acid phase containing said extracted gallium values; (iii) adjusting the halide ion concentration of the acidic gallium phase; (iv) selectively extracting gallium values from said acidic gallium phase; and (v) recovering such selectively extracted gallium values.

2. The process as defined by claim 1, wherein the halide ion concentration in stage (iii) is adjusted to a value of from 3.5 M to 8 M.

3. The process as defined by claim 1, wherein the halide ion concentration is adjusted in stage (iii) by the addition of gaseous hydrochloric acid, or a solution thereof.

4. The process as defined by claim 1, wherein the acidic gallium phase from stage (ii) has a $H^+$ ion concentration of at least 1.5 N.

5. The process as defined by claim 4, said $H^+$ ion concentration ranging from 1.5 to 6 N.

6. The process as defined by claim 4, wherein the halide ion concentration is at most 2.5 M.

7. The process as defined by claim 4, said $H^+$ ion concentration ranging from 3.5 N to 4.5 N.

8. The process as defined by claim 1, comprising controlling the $H^+$ ion and halide concentration in the acidic phase after stage (iv), prior to the recycling thereof.

9. The process as defined by claim 1, wherein said organic extractant comprises a substituted hydroxyquinoline, or a derivative or mixture thereof.

10. The process as defined by claim 1, comprising selectively extracting the gallium values in stage (iv) by passing the acidic gallium solution over a basic ion exchange resin.

11. The process as defined by claim 1, comprising selectively extracting the gallium values in stage (iv) by liquid/liquid extraction.

12. The process as defined by claim 11, said liquid/liquid extraction entailing an anionic or solvating extractant.

13. Apparatus for the separation and recovery of gallium values from a strongly basic aqueous solution thereof, which comprises (i) a liquid/liquid extraction zone for contacting such basic solution with an organic phase comprising an organic extractant and an organic solvent and for liquid/liquid extracting gallium values therefrom, and to permit phase separation into an aqueous phase and an organic phase containing said extracted gallium values; (ii) means for contacting said organic phase with a solution of an acid halide in part recycled from the below stage (iv), after the selective extraction thereof, and for liquid/liquid extracting gallium values therefrom, and to permit phase separation into a second organic phase and an acid phase containing said extracted gallium values; (iii) means for adjusting the halide ion concentration of the acidic gallium phase; (iv) means for selectively extracting gallium values from said acidic gallium phase; and (v) means for recovering such selectively extracted gallium values.

* * * * *